US012644688B2

(12) United States Patent
Yang et al.

(10) Patent No.: US 12,644,688 B2
(45) Date of Patent: Jun. 2, 2026

(54) POSITION SENSING SYSTEM, METHOD FOR ACQUIRING POSITION SENSING SIGNAL, AND ELECTRONIC DEVICE

(71) Applicant: Shanghai Awinic Technology Co., Ltd., Shanghai (CN)

(72) Inventors: Chao Yang, Shanghai (CN); Hao Wei, Shanghai (CN); Youjie Yin, Shanghai (CN)

(73) Assignee: Shanghai Awinic Technology Co., Ltd. (CN)

( * ) Notice: Subject to any disclaimer, the term of this patent is extended or adjusted under 35 U.S.C. 154(b) by 494 days.

(21) Appl. No.: 18/251,059

(22) PCT Filed: Nov. 3, 2021

(86) PCT No.: PCT/CN2021/128324
§ 371 (c)(1),
(2) Date: Apr. 28, 2023

(87) PCT Pub. No.: WO2022/095875
PCT Pub. Date: May 12, 2022

(65) Prior Publication Data
US 2023/0417528 A1      Dec. 28, 2023

(30) Foreign Application Priority Data

Nov. 3, 2020    (CN) .......................... 202011209677.8

(51) Int. Cl.
*G01B 7/00*          (2006.01)
(52) U.S. Cl.
CPC ..................................... *G01B 7/003* (2013.01)
(58) Field of Classification Search
CPC ...... G01B 21/045; G01B 7/003; G01D 3/036; G01D 5/145
See application file for complete search history.

(56) References Cited

U.S. PATENT DOCUMENTS 5,932,984 A * 8/1999 Murakami ......... H04N 23/6812
318/560
2008/0177500 A1* 7/2008 Yamazaki ............. H02P 29/685
702/150
(Continued)

FOREIGN PATENT DOCUMENTS

CN          101432594 A      5/2009
CN          104655003 A      5/2015
(Continued)

OTHER PUBLICATIONS

International search report for PCT/CN2021/128324, issued on Jan. 19, 2022.

*Primary Examiner* — Eman A Alkafawi
*Assistant Examiner* — Suresh K Rajaputra
(74) *Attorney, Agent, or Firm* — Emerson, Thomson & Bennett, LLC; Roger D. Emerson; Peter R. Detorre

(57)          ABSTRACT

A position sensing system, a method for acquiring a position sensing signal and an electronic device are provided. The position sensing system is provided with a first position sensing element and at least one second position sensing element. A first position sensing signal outputted by the first position sensing element in response to a predetermined signal is used as a correction signal for a second position sensing signal outputted by the second position sensing element, and the signal processing module corrects the second position sensing signal outputted by at least one of the second position sensing element based on the first position sensing signal and determines a target sensing signal based on at least one corrected second position sensing signal.

15 Claims, 5 Drawing Sheets

(56)     References Cited

U.S. PATENT DOCUMENTS

2009/0177436 A1* 7/2009 Yoshida ................. G01D 5/145
                                                        324/207.2
2014/0225596 A1* 8/2014 Nakamura ............. G01D 5/145
                                                        324/207.2

FOREIGN PATENT DOCUMENTS

| CN | 106524887 | A | 3/2017 |
|----|-----------|---|--------|
| CN | 107044819 | A | 8/2017 |
| CN | 107121648 | A | 9/2017 |
| CN | 108362925 | A | 8/2018 |
| CN | 112325755 | A | 2/2021 |
| JP | UP07190800 | A | 7/1995 |
| JP | 2002064993 | A | 2/2002 |
| JP | 2003035504 | A | 2/2003 |
| JP | 2008514913 | A | 5/2008 |
| JP | 2008180560 | A | 8/2008 |
| JP | 2011169813 | A | 9/2011 |
| JP | 2015184209 | A | 10/2015 |
| JP | 2019203854 | A | 11/2019 |
| WO | WO2006/035350 | A1 | 4/2006 |
| WO | WO2006/064687 | A1 | 6/2006 |
| WO | WO2007/126023 | A1 | 11/2007 |
| WO | WO2019/230203 | A1 | 12/2019 |

* cited by examiner

POSITION SENSING SYSTEM, METHOD FOR ACQUIRING POSITION SENSING SIGNAL, AND ELECTRONIC DEVICE

This application is the national phase of International Patent Application No. PCT/CN2021/128324, titled "POSITION SENSING SYSTEM, METHOD FOR ACQUIRING POSITION SENSING SIGNAL, AND ELECTRONIC DEVICE". filed on Nov. 3, 2021, which claims the priority to Chinese Patent Application No. 202011209677.8, titled "POSITION SENSING SYSTEM, METHOD FOR ACQUIRING POSITION SENSING SIGNAL, AND ELECTRONIC DEVICE", filed on Nov. 3, 2020 with the China National Intellectual Property Administration both of which are incorporated herein by reference in their entireties.

TECHNICAL FIELD

The present disclosure relates to the field of sensing technology, and in particular to a position sensing system, a method for acquiring a position sensing signal and an electronic device.

BACKGROUND

With the continuous development of sensing technology, measuring accuracies of various sensors are greatly improved. Taking position sensing or distance sensing as an example, the accuracy of the sensor has reached micron level.

However, in actual applications, it is found that in a case that the sensing accuracy for the distance is required to be at the micron level, a subtle change in an environment where a position sensing element is located will adversely affect the measuring accuracy of the position sensing element.

Therefore, how to eliminate an adverse effect of an environment where a position sensing element is located on a sensing accuracy is researched by those skilled in the art.

SUMMARY

In order to solve the above technical problem, a position sensing system, a method for acquiring a position sensing signal and an electronic device are provided according to the present disclosure to eliminate an adverse effect of an environment where a position sensing element is located on a sensing accuracy.

In order to achieve the above technical objective, the following technical solutions are provided according to the present disclosure.

A position sensing system is provided according to the present disclosure. The position sensing system includes a signal processing module, a first position sensing element and at least one second position sensing element. The first position sensing element is configured to output a first position sensing signal in response to a predetermined signal. The second position sensing element is configured to output a second position sensing signal in response to the predetermined signal. The signal processing module is configured to: provide the predetermined signal to the first position sensing element and the second position sensing element, correct the second position sensing signal outputted by at least one of the second position sensing element based on the first position sensing signal, and determine a target sensing signal based on at least one corrected second position sensing signal.

In an embodiment, the signal processing module includes a selection control circuit, a variable gain amplifier, a sampling and holding circuit, a digital control circuit, and a current source control circuit.

The selection control circuit includes multiple channels. The multiple channels correspond to the first position sensing element and at least one of the second position sensing element with one-to-one correspondence. The selection control circuit is configured to connect the first position sensing element and the at least one of the second position sensing element with the variable gain amplifier through the multiple channels.

The variable gain amplifier is configured to amplify the first position sensing signal outputted by the first position sensing element and the second position sensing signal outputted by the second position sensing element to obtain an amplified first position sensing signal and an amplified second position sensing signal.

The sampling and holding circuit is configured to convert the amplified first position sensing signal in an analog voltage signal form to an amplified first position sensing signal in a digital signal form, and transmit the amplified first position sensing signal in the digital signal form to the digital control circuit.

The digital control circuit is configured to: control the current source control circuit to provide the predetermined signal to the first position sensing element and the second position sensing element, correct at least one second position sensing signal in the digital signal form based on the first position sensing signal in the digital signal form, and determine the target sensing signal based on at least one corrected second position sensing signal.

In an embodiment, the digital control circuit is further configured to adjust the predetermined signal based on the first position sensing signal outputted by the first position sensing element to control the first position sensing element to output a first position sensing signal having a predetermined constant amplitude.

In an embodiment, the digital control circuit configured to correct the second position sensing signal outputted by the at least one of the second position sensing element based on the first position sensing signal by:

substituting/putting the first position sensing signal in a following first predetermined equation to calculate the corrected second position sensing signal:

$$V2 = VOUT * \frac{A2 \times B2}{A1 \times B1}.$$

where V2 represents the corrected second position sensing signal, VOUT represents a first position sensing signal having a predetermined constant amplitude, A2 represents an amplification factor of the signal processing module for a signal outputted by the second position sensing element, A1 represents an amplification factor of the signal processing module for a signal outputted by the first position sensing element, B2 represents a magnetic field intensity of a magnetic field at the second position sensing element, and B1 represents a magnetic field intensity of a magnetic field at the first position sensing element.

In an embodiment, in a case that the number of the second position sensing element is greater than 1 and the number of the corrected second position sensing signal is greater than 1, the digital control circuit is configured to determine the target sensing signal based on the at least one corrected second position sensing signal by: determining one of corrected second position sensing signals as the target sensing signal.

In an embodiment, in a case that the number of the second position sensing element is greater than 1 and the number of the corrected second position sensing signal is greater than 1, the digital control circuit is configured to determine the target sensing signal based on the at least one corrected second position sensing signal by: determining an average value of all corrected second position sensing signals as the target sensing signal.

In an embodiment, the digital control circuit is further configured to control the current source control circuit to mirror the predetermined signal and transmit the mirrored predetermined signal to the first position sensing element and the second position sensing element.

In an embodiment, the selection control circuit and the sampling and holding circuit are configured to operate using a same clock.

In an embodiment, the digital control circuit is further configured to determine target position information based on the target sensing signal.

In an embodiment, the predetermined signal includes a predetermined current signal or a predetermined voltage signal.

A method for acquiring a position sensing signal is further provided according to the present disclosure. The method is applicable to a position sensing system including a first position sensing element and at least one second position sensing element. The method for acquiring a position sensing signal includes: acquiring the first position sensing signal outputted by the first position sensing element in response to a predetermined signal; acquiring a second position sensing signal outputted by the second position sensing element in response to the predetermined signal; and correcting the second position sensing signal outputted by at least one of the second position sensing element based on the first position sensing signal, and determining a target sensing signal based on at least one corrected second position sensing signal.

In an embodiment, the correcting the second position sensing signal outputted by at least one of the second position sensing element based on the first position sensing signal includes: substituting the first position sensing signal in a following first predetermined equation to calculate the corrected second position sensing signal:

$$V2 = VOUT * \frac{A2 \times B2}{A1 \times B1}.$$

where V2 represents the corrected second position sensing signal, VOUT represents a first position sensing signal having a predetermined constant amplitude, A2 represents an amplification factor of a signal processing module for a signal outputted by the second position sensing element, A1 represents an amplification factor of the signal processing module for a signal outputted by the first position sensing element, B2 represents a magnetic field intensity of a magnetic field at the second position sensing element, and B1 represents a magnetic field intensity of a magnetic field at the first position sensing element.

In an embodiment, in a case that the number of the second position sensing element is greater than 1 and the number of the corrected second position sensing signal is greater than 1, the determining a target sensing signal based on at least one corrected second position sensing signal includes: determining one of corrected second position sensing signals as the target sensing signal.

In an embodiment, in a case that the number of the second position sensing element is greater than 1 and the number of the corrected second position sensing signal is greater than 1, the determining a target sensing signal based on at least one corrected second position sensing signal includes: determining an average value of all corrected second position sensing signals as the target sensing signal.

An electronic device is further provided according to the present disclosure. The electronic device includes the position sensing system described above and a magnet for providing a magnetic field.

It can be seen from the above technical solutions that a position sensing system, a method for acquiring a position sensing signal and an electronic device are provided according to the present disclosure. The position sensing system is provided with a first position sensing element and at least one second position sensing element. A first position sensing signal outputted by the first position sensing element in response to a predetermined signal may be used as a correction signal for a second position sensing signal outputted by the second position sensing element, so that the signal processing module may correct the second position sensing signal outputted by at least one of the second position sensing element based on the first position sensing signal and determine a target sensing signal based on at least one corrected second position sensing signal, thereby eliminating a negative effect of an environment in which a position sensing element is located on a finally obtained position sensing signal, and improving the accuracy of the position sensing signal obtained by the position sensing system.

BRIEF DESCRIPTION OF THE DRAWINGS

In order to more clearly illustrate technical solutions in embodiments of the present disclosure or in the conventional technology, the drawings to be used in the description of the embodiments or in the conventional technology are briefly described below. Apparently, the drawings in the following description show only some embodiments of the present disclosure, and other drawings may be obtained by those skilled in the art from the drawings without any creative work.

DETAILED DESCRIPTION

Figure 1:
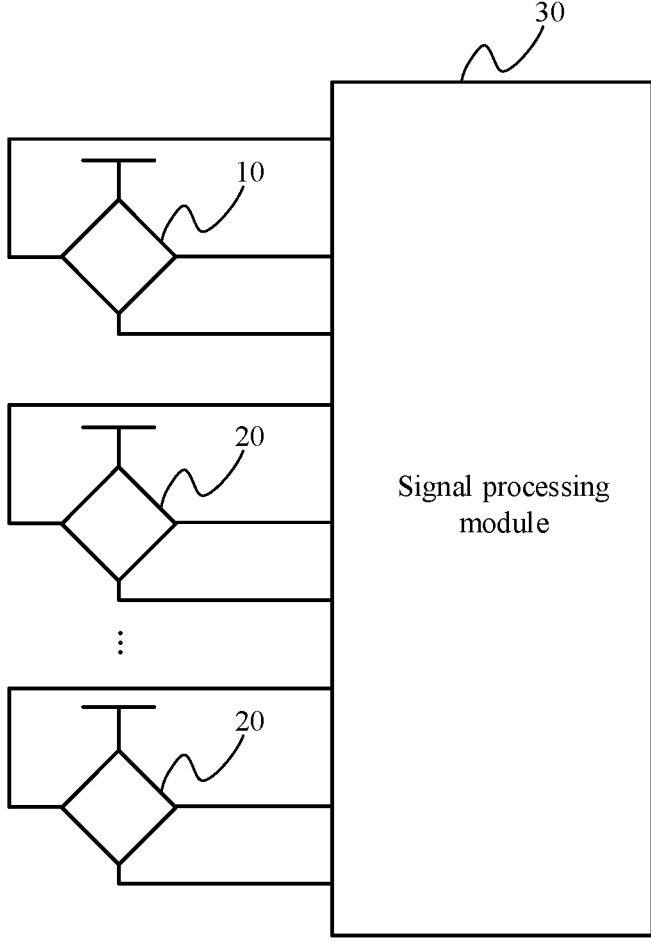
FIG. 1 is a schematic structural diagram of a position sensing system according to an embodiment of the present disclosure.

As described in the background technology, in a case that the sensing accuracy for position or distance is at the micron level, a change of the environmental environment where the position sensing element is located greatly affects the sensing accuracy of the position sensing element. A position sensing system including a Hall element, a variable gain amplifier and other components is taken as an example. In the system, a sensitivity of the hall element under a driving current, an amplification factor of the variable gain amplifier in the system and a magnetic field intensity provided by a magnet for the hall element are all positively related to a signal outputted by the hall element. It should be found that the sensitivity of the hall element under a driving current is related to an ambient temperature, and the magnetic field intensity provided by the magnet for the hall element is related to an angle between the magnet and the hall element. The environmental factors adversely affect the signal outputted by the hall element.

In order to eliminate the effect, a position sensing system is provided according to an embodiment of the present disclosure. The position sensing system includes a signal processing module, a first position sensing element and at least one second position sensing element.

The first position sensing element is configured to output a first position sensing signal in response to a predetermined signal.

The second position sensing element is configured to output a second position sensing signal in response to the predetermined signal. The predetermined signal includes a predetermined current signal or a predetermined voltage signal.

The signal processing module is configured to: provide the predetermined signal to the first position sensing element and the second position sensing element, correct the second position sensing signal outputted by at least one of the second position sensing element based on the first position sensing signal, and determine a target sensing signal based on at least one corrected second position sensing signal.

The position sensing system is provided with the first position sensing element and the at least one second position sensing element. The first position sensing signal outputted by the first position sensing element in response to the predetermined signal may be used as a correction signal for the second position sensing signal outputted by the second position sensing element, so that the signal processing module may correct the second position sensing signal outputted by at least one of the second position sensing element based on the first position sensing signal and determine the target sensing signal based on at least one corrected second position sensing signal, thereby eliminating a negative effect of an environment in which a position sensing element is located on a finally obtained position sensing signal, and improving the accuracy of the position sensing signal obtained by the position sensing system.

Hereinafter, the technical solutions in the embodiments of the present disclosure are described clearly and completely in conjunction with the drawings in the embodiments of the present disclosure. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

A position sensing system is provided according to an embodiment of the present disclosure. As shown in FIG. 1, the position sensing system includes: a signal processing module 30, a first position sensing element 10, and at least one second position sensing element 20.

The first position sensing element 10 is configured to output a first position sensing signal in response to a predetermined signal.

The second position sensing element 20 is configured to output a second position sensing signal in response to the predetermined signal. The predetermined signal includes a predetermined current signal or a predetermined voltage signal.

The signal processing module 30 is configured to: provide the predetermined signal to the first position sensing element 10 and the second position sensing element 20, correct the second position sensing signal outputted by at least one of the second position sensing element 20 based on the first position sensing signal, and determine a target sensing signal based on at least one corrected second position sensing signal.

In a case that one second position sensing element is configured, the signal processing module provides a predetermined signal to the first position sensing element and the second position sensing element, the first position sensing element outputs a first position sensing signal in response to the predetermined signal, and the second position sensing element outputs a second position sensing signal in response to the predetermined signal. Then, the signal processing module corrects the second position sensing signal based on the first position sensing signal, and determines a target sensing signal based on the corrected second position sensing signal.

It should be noted that in the embodiments of the present disclosure, the number of the second position sensing element is not limited, and may be determined according to actual design requirements of the position sensing system.

In an embodiment, in order to ensure a correction effect of the first position sensing signal outputted by the first position sensing element 10 on the second position sensing signal outputted by the second position sensing element 20, the first position sensing element 10 and the second position sensing element 20 have a same model and a same parameter, so that an effect of environmental factors on the first position sensing signal is the same as an effect of the environmental factors on the second position sensing signal (for example, both the effects are positive correlation or negative correlation). In an embodiment, both the first position sensing element 10 and the second position sensing element 20 may be hall elements.

That is, in order to avoid that the effect of the environmental factor on the first position sensing signal is different from the effect of the environmental factor on the second position sensing signal due to that the first position sensing element 10 is different from the second position sensing element 20 and then ensure the correction effect of the first position sensing signal on the second position sensing signal, in a preferred embodiment of the present disclosure, the first position sensing element 10 is exactly the same as the second position sensing element 20.

Therefore, with the position sensing system according to the present disclosure, a sensing signal outputted by a position sensing element is corrected based on a sensing signal outputted by another position sensing element, and a target sensing signal is determined based on the corrected sensing signals, thereby eliminating a negative effect of an environmental environment in which a single position sensing element is located on a finally obtained target sensing signal, and improving the accuracy of the position sensing signal obtained by the position sensing system.

Figure 2:
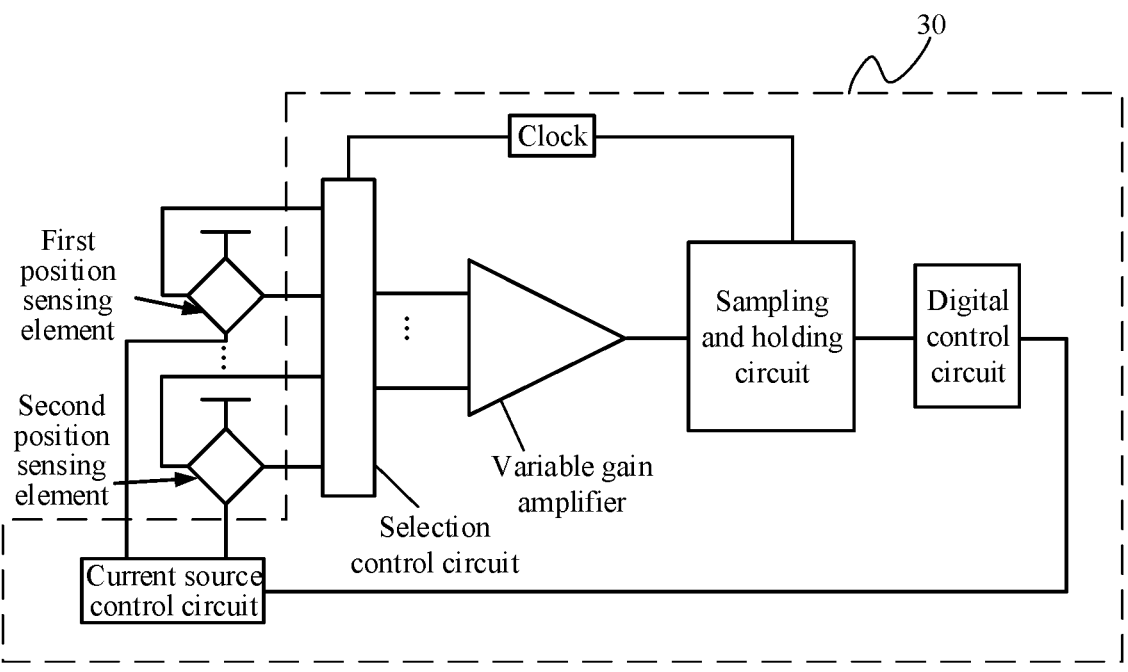
FIG. 2 is a schematic structural diagram of a position sensing system according to another embodiment of the present disclosure.

Reference is made to FIG. 2, which shows a structure of a signal processing module 30. The signal processing module 30 includes a selection control circuit, a variable gain amplifier, a sampling and holding circuit, a current source control circuit and a digital control circuit. The selection control circuit includes multiple channels. The multiple channels correspond to the first position sensing element and at least one of the second position sensing element with one-to-one correspondence The selection control circuit connects the first position sensing element 10 and the at least one of the second position sensing element 20 with the variable gain amplifier through the multiple channels. Each of the channels of the selection control circuit corresponds to a position sensing element (the first position sensing element 10 or the second position sensing element 20).

The variable gain amplifier is configured to amplify the first position sensing signal outputted by the first position sensing element 10 and the second position sensing signal outputted by the second position sensing element 20 to obtain an amplified first position sensing signal and an amplified second position sensing signal. The amplified first position sensing signal and the amplified second position sensing signal are analog voltage signals.

The sampling and holding circuit converts the amplified first position sensing signal in an analog voltage signal form to an amplified first position sensing signal in a digital signal form, and transmits the amplified first position sensing signal in the digital signal form to the digital control circuit.

The digital control circuit is configured to: control the current source control circuit to provide the predetermined signal to the first position sensing element and the second position sensing element, correct at least one second position sensing signal in the digital signal form based on the first position sensing signal in the digital signal form, and determine the target sensing signal based on at least one corrected second position sensing signal.

The digital control circuit adjusts an amplitude of the predetermined signal provided by the current source control circuit to the first position sensing element 10, so that the signal (that is, the first position sensing signal) outputted by the first position sensing element 10 is adjusted to have a predetermined constant amplitude, and a corresponding predetermined signal is retained.

The digital control circuit mirrors the predetermined signal to a branch where the second position sensing element is arranged by using the current source control circuit, so that the predetermined signal drives the second position sensing element.

In addition, the digital control circuit corrects at least one second position sensing signal in the digital signal form based on the first position sensing signal in the digital signal form, and determines the target sensing signal based on at least one corrected second position sensing signal, so as to determine position information of a target.

It should be noted that after determining the target sensing signal, the digital control circuit may further determine target position information based on the target sensing signal, and perform subsequent operations based on the target position information.

As shown in FIG. 2, the predetermined signal for driving the first position sensing element 10 and the second position sensing element 20 to operate may be provided by the signal processing module 30. The digital control circuit in the signal processing module 30 is further configured to adjust the predetermined signal based on the first position sensing signal outputted by the first position sensing element 10, so that the first position sensing element outputs a first position sensing signal having a predetermined constant amplitude. In adjusting the predetermined signal, the digital control circuit controls the current source control circuit to mirror the predetermined signal and transmit a mirrored predetermined signal to the first position sensing element and the second position sensing element. That is, the current source control circuit is configured to mirror the predetermined signal to form two identical predetermined signals, and transmits the two identical predetermined signals respectively to the first position sensing element and the second position sensing element.

Figure 7:
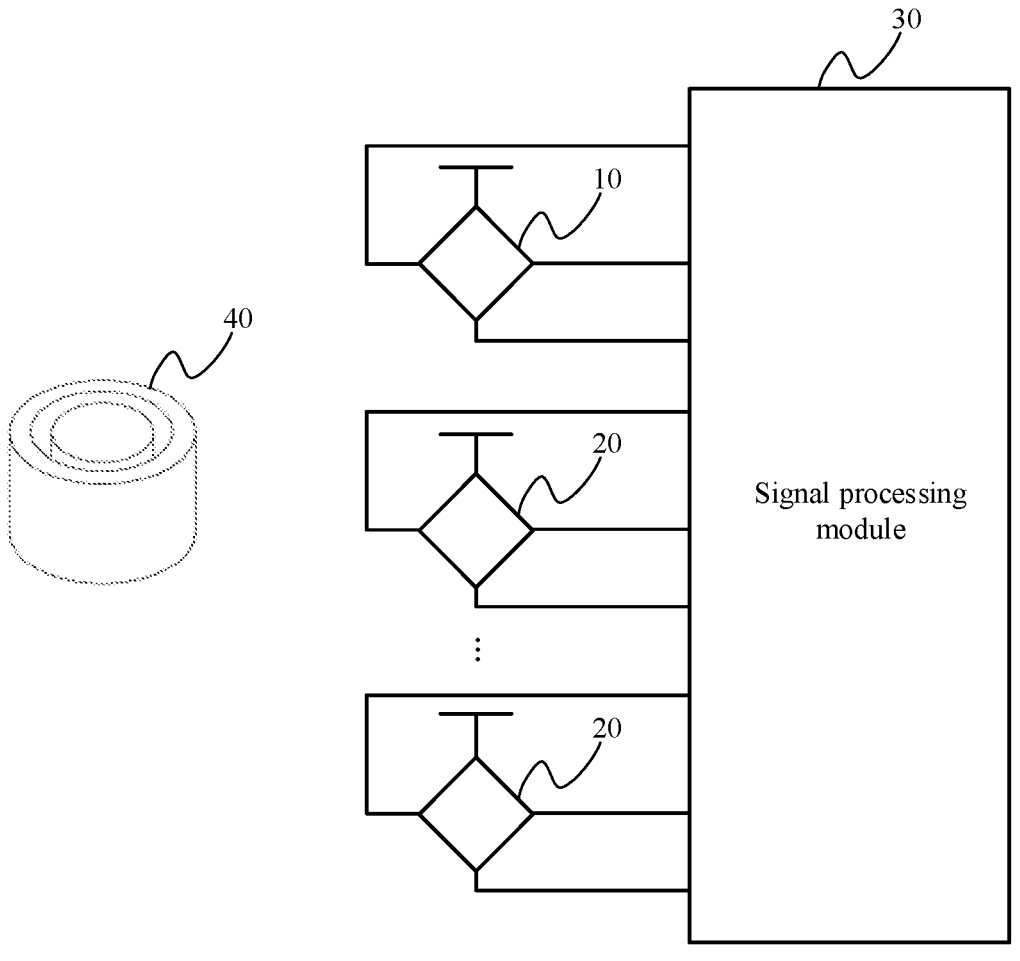
FIG. 7 is a schematic structural diagram of an electronic device according to an embodiment of the present disclosure.

The predetermined signal includes a predetermined current signal and a predetermined voltage signal. As shown in FIG. 1 and FIG. 7, it is assumed that at a time point, the predetermined current signal is represented as I1, a sensitivity of the first position sensing element 10 is represented as K11 at the predetermined current signal I1, an amplification factor with which the variable gain amplifier amplifies the predetermined current signal for the first position sensing element 10 is represented as A1, a sensitivity of the second position sensing element 20 is also represented as K11 at the predetermined current signal I1, an amplification factor with which the variable gain amplifier amplifies the predetermined current signal for the second position sensing element 20 is represented as A2, a magnetic field intensity of a magnetic field generated by a magnet 40 at the first position sensing element 10 is represented as B1, and a magnetic field intensity of a magnetic field generated by the magnet 40 at the second position sensing element 20 is represented as B2, then the first position sensing signal outputted by the first position sensing element 10 is amplified by the variable gain amplifier to obtain a signal V1, and the signal V1 is expressed as:

$$V1 = A1*K11*B1 = VOUT \tag{1}$$

where VOUT represents a first position sensing signal having a predetermined constant amplitude. The signal V1 obtained by the variable gain amplifier may be controlled to be equal to the constant voltage signal VOUT by adjusting the predetermined current. The second position sensing signal outputted by the second position sensing element 20 is amplified by the variable gain amplifier to obtain a signal V2, and the signal V2 is expressed as:

$$V2 = A2*K11*B2 \tag{2}$$

The following equation (3) may be obtained based on equation (1):

$$K11 = VOUT/A1/B1 \tag{3}$$

A first predetermined equation may be obtained by substituting the equation (3) in equation (2) for correcting the second position sensing signal. The first predetermined equation is expressed as:

$$V2 = VOUT * \frac{A2 \times B2}{A1 \times B1}.$$

In an embodiment, the digital control circuit corrects the second position sensing signal outputted by the at least one of the second position sensing element 20 based on the first position sensing signal by substituting the first position sensing signal in the following first predetermined equation to calculate the corrected second position sensing signal:

$$V2 = VOUT * \frac{A2 \times B2}{A1 \times B1}.$$

where V2 represents the corrected second position sensing signal, VOUT represents a first position sensing signal having a predetermined constant amplitude, A2 represents an amplification factor of the signal processing module 30 for an analog signal outputted by the second position sensing element 20 (that is, an amplification factor of the variable gain amplifier for the analog signal outputted by the second position sensing element 20), A1 represents an amplification factor of the signal processing module 30 for an analog signal outputted by the first position sensing element 10 (that is, an amplification factor of the variable gain amplifier for the analog signal outputted by the first position sensing element B2 represents a magnetic field intensity of a magnetic field at the second position sensing element, and B1 represents a magnetic field intensity of a magnetic field at the first position sensing element.

Based on the above predetermined equation, it can be seen that the corrected second position sensing signal V2 is independent of the sensitivity K11 and the ambient temperature mainly affects a sensitivity of an analog signal outputted by a sensing element, thus the corrected second position sensing signal is independent of the ambient temperature, thereby eliminating the effect of the ambient temperature on the finally obtained target sensing signal, and improving the accuracy of the position sensing signal obtained by the position sensing system.

In addition, for a single position sensing element, an angle between the magnet 40 and the position sensing element determines an effective magnetic flux of the position sensing element, affecting a magnetic field intensity of a magnetic field provided by the magnet for the position sensing element, and affecting the accuracy of the signal outputted by the position sensing element. Based on the above predetermined equation, it can be seen that the angles between the multiple position sensing elements and the magnet 40 are different. An effect of an angle on an accuracy of an outputted signal may be greatly reduced by correcting a position sensing element using another position sensing element. A shorter distance between position sensing elements indicates a less effect of an angle on an accuracy of an outputted signal. For example, when both the first position sensing element and the second position sensing element are Hall elements and the distance between the first position sensing element and the second position sensing element is small, an angle between the magnet and the first position sensing element and an angle between the magnet and the second position sensing element have a small difference, and an effective magnetic flux of the magnet for the first position sensing element and an effective magnetic flux of the magnet for the second position sensing element have a small difference, so that one of the first position sensing element and the second position sensing element may be accurately corrected based on the other one of the first position sensing element and the second position sensing element.

The operation process of the digital control circuit is described below. In an embodiment of the present disclosure, after obtaining the first position sensing signal, the digital control circuit randomly selects one second position sensing element 20, corrects a second position sensing signal outputted by the selected second position sensing element 20, determines the corrected second position sensing signal as a position sensing signal and outputs the corrected second position sensing signal.

In other embodiments of the present disclosure, after obtaining the first position sensing signal, the digital control circuit may correct second position sensing signals outputted by two or more of the second position sensing elements 20 (that is, when the number of the second position sensing elements 20 is greater than 1 and the number of the corrected second position sensing signals is greater than 1), the digital control circuit may determine one of corrected second position sensing signals as the target sensing signal (that is, the digital control circuit determines the target sensing signal based on the at least one corrected second position sensing signal by: determining one of corrected second position sensing signals as the target sensing signal). In addition, the digital control circuit may determine an average value of all the corrected second position sensing signals as the target sensing signal (that is, the digital control circuit determines the target sensing signal based on the at least one corrected second position sensing signal by: determining an average value of all corrected second position sensing signals as the target sensing signal).

In an embodiment, the selection control circuit and the sampling and holding circuit operate using a same clock. The selection control circuit and the sampling and holding circuit uses the same clock may keep clock synchronization, thereby reducing burrs in the signals outputted by the sampling and holding circuit, and improving the stability of the system and the accuracy of signal processing.

A method for acquiring a position sensing signal according to an embodiment of the present disclosure is described below. The method for acquiring a position sensing signal described below and the position sensing system described above may be referred to each other.

Figure 3:
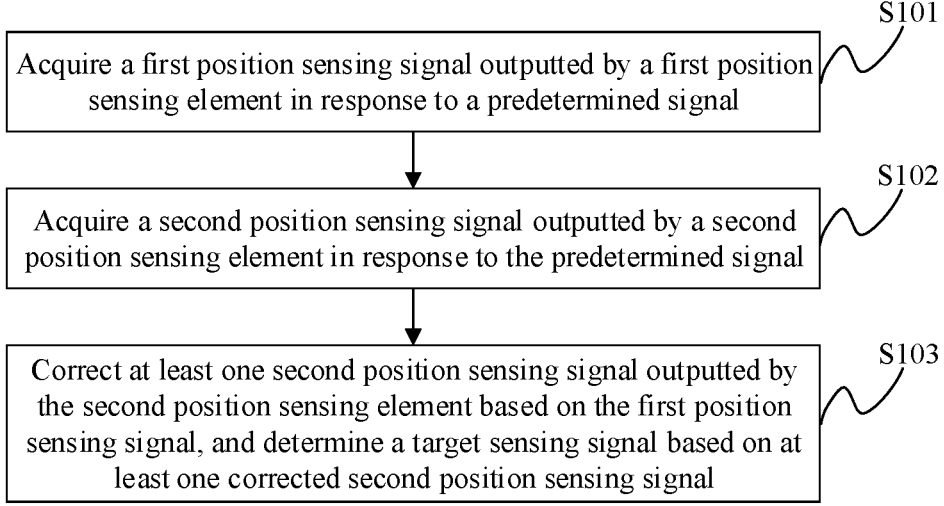
FIG. 3 is a flow chart of a method for acquiring a position sensing signal according to an embodiment of the present disclosure.

A method for acquiring a position sensing signal is provided according to an embodiment of the present disclosure. The method is applicable to a position sensing system including a first position sensing element and at least one second position sensing element. As shown in FIG. 3, the method for acquiring a position sensing signal includes the following steps S101 to S103.

In step S101, a first position sensing signal outputted by the first position sensing element in response to a predetermined signal is acquired.

In step S102, a second position sensing signal outputted by the second position sensing element in response to the predetermined signal is acquired.

In step S103, the second position sensing signal outputted by at least one of the second position sensing element is corrected based on the first position sensing signal, and a target sensing signal is determined based on at least one corrected second position sensing signal.

Figure 4:
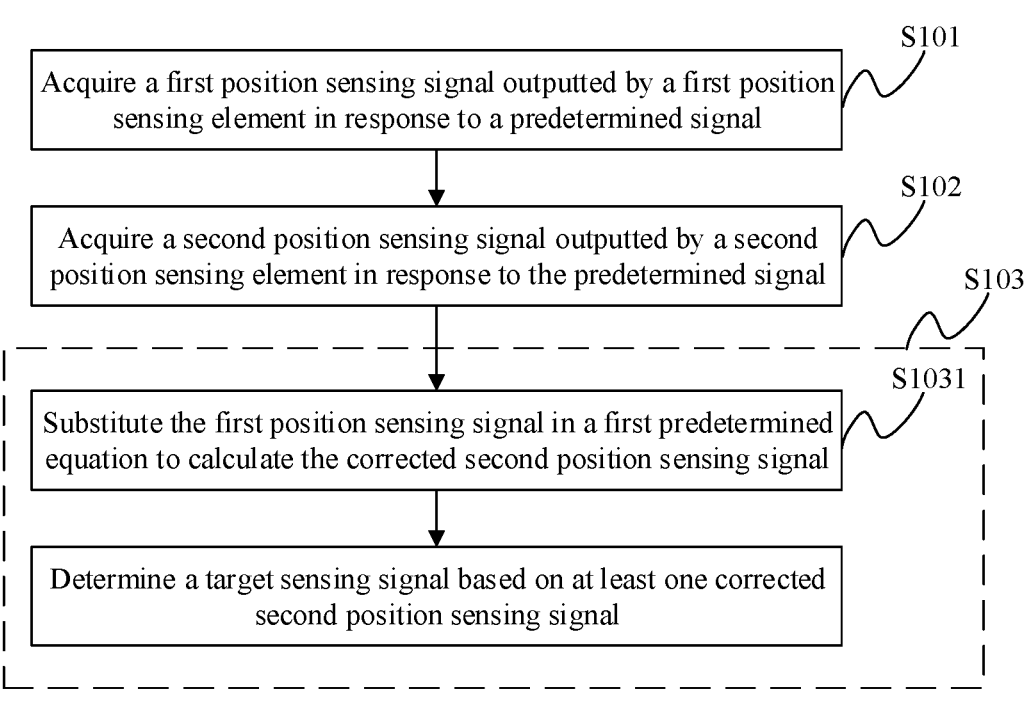
FIG. 4 is a flow chart of a method for acquiring a position sensing signal according to another embodiment of the present disclosure.

In an embodiment, as shown in FIG. 4, the correcting the second position sensing signal outputted by at least one second position sensing element based on the first position sensing signal includes the following step S1031.

In step S1031, the first position sensing signal is substituted in the following first predetermined equation to calculate the corrected second position sensing signal:

$$V2 = VOUT * \frac{A2 \times B2}{A1 \times B1}.$$

where V2 represents the corrected second position sensing signal, VOUT represents a first position sensing signal having a predetermined constant amplitude, A2 represents an amplification factor of the signal processing module for an analog signal outputted by the second position sensing element (that is, an amplification factor of the variable gain amplifier for the analog signal outputted by the second position sensing element), A1 represents an amplification factor of the signal processing module for an analog signal outputted by the first position sensing element, B2 represents a magnetic field intensity of a magnetic field at the second position sensing element, and B1 represents a magnetic field intensity of a magnetic field at the first position sensing element.

Figure 5:
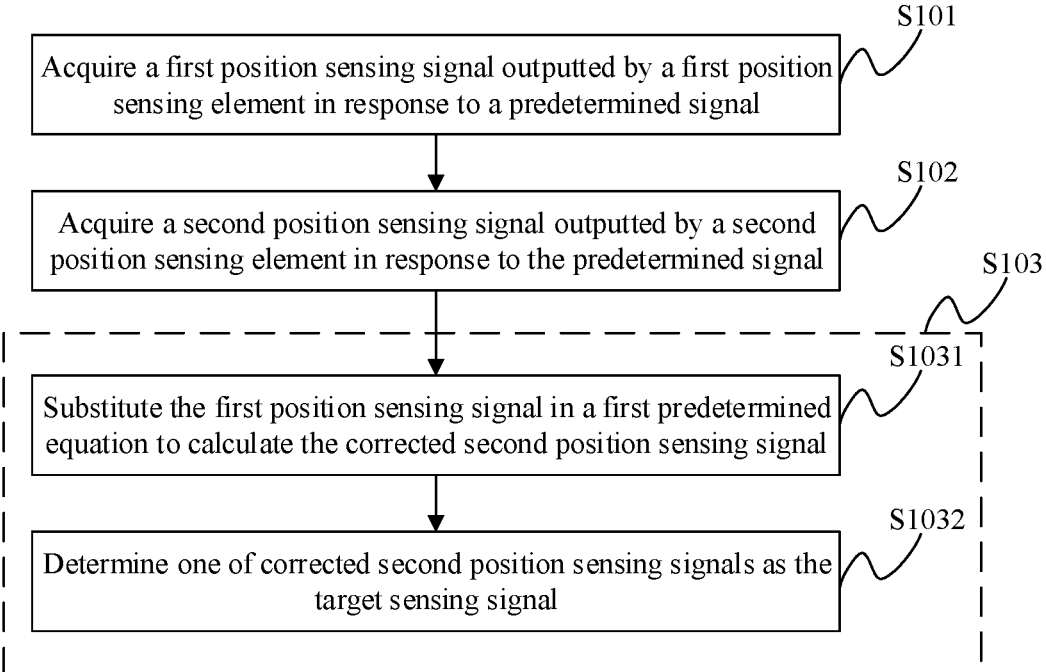
FIG. 5 is a flow chart of a method for acquiring a position sensing signal according to another embodiment of the present disclosure.

In an embodiment, when the number of the second position sensing element is greater than 1 and the number of the corrected second position sensing signal is greater than 1, as shown in FIG. 5, the determining a target sensing signal based on at least one corrected second position sensing signal includes the following step S1032.

In step S1032, one of corrected second position sensing signals is determined as the target sensing signal.

Figure 6:
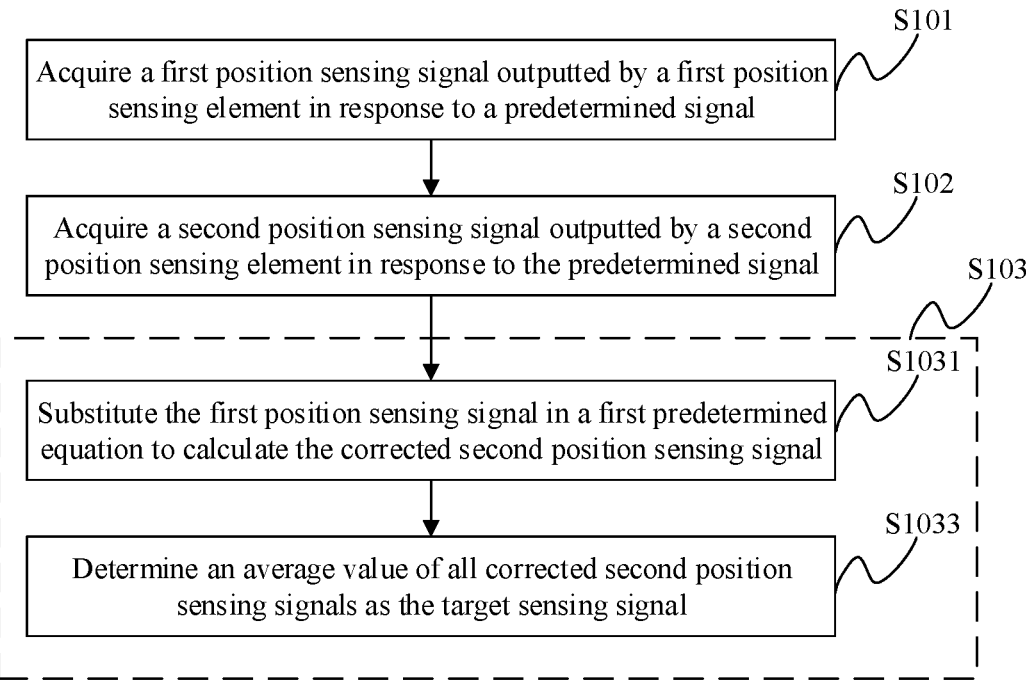
FIG. 6 is a flow chart of a method for acquiring a position sensing signal according to another embodiment of the present disclosure.

In an embodiment, when the number of the second position sensing element is greater than 1 and the number of the corrected second position sensing signal is greater than 1, as shown in FIG. 6, the determining a target sensing signal based on at least one corrected second position sensing signal includes the following step S1033.

In step S1033, an average value of all corrected second position sensing signals is determined as the target sensing signal.

An electronic device is further provided according to an embodiment of the present disclosure. The electronic device includes the position sensing system according to any one of the above embodiments. The electronic device further includes a component for providing a magnetic field, such as a magnet. The electronic device may be a smart phone, a tablet computer, and the like, which is not limited in the embodiment of the present disclosure.

Reference is made to FIG. 7, which is a schematic diagram of a position sensing system according to an embodiment of the present disclosure. In FIG. 1, a position sensing system and a magnet 40 are included. The magnet 40 is configured to provide a magnetic field. The position sensing system detects a position of a target object based on the magnetic field provided by the magnet 40. When the first position sensing element 10 and the second position sensing element 20 have a same model and a same parameter (both the first position sensing element and the second position sensing element are Hall elements), factors that may affect a target output signal mainly include an ambient temperature and angles between the magnet and the position sensing elements. The ambient temperature mainly affects the sensitivity of the signal processing module 30 for analog signals outputted by the first position sensing element 10 and the second position sensing element 20, thereby affecting the analog signals outputted by the position sensing elements. The angles between the magnet 40 and the position sensing elements affect magnetic field intensities of the magnetic fields generated by the magnet at the positions of the position sensing elements. For example, the angle between the magnet 40 and the first position sensing element 10 mainly affects the effective magnetic flux generated by the magnet 40 at the position of the first position sensing element 10, that is, affects a magnetic field intensity of a magnetic field generated by the magnet 40 at the position of the first position sensing element. The angle between the magnet 40 and the second position sensing element 20 mainly affects the effective magnetic flux generated by the magnet 40 at the position of the second position sensing element 20, that is, affects a magnetic field intensity of a magnetic field generated by the magnet 40 at the position of the second position sensing element 20, thereby affecting the position sensing signal outputted by the position sensing element.

Therefore, with the electronic device based on the position sensing system, a sensing signal outputted by a position sensing element may be corrected based on a sensing signal outputted by another position sensing element, and a target sensing signal is determined based on the corrected sensing signal, eliminating a negative effect of an the environment in which a single position sensing element is located on a finally obtained target sensing signal, and improving the accuracy of the position sensing signal obtained by the position sensing system.

In summary, a position sensing system, a method for acquiring a position sensing signal and an electronic device are provided according to the present disclosure. The position sensing system is provided with a first position sensing element and at least one second position sensing element. A first position sensing signal outputted by the first position sensing element in response to a predetermined signal may be used as a correction signal for a second position sensing signal outputted by the second position sensing element, so that the signal processing module may correct the second position sensing signal outputted by at least one of the second position sensing element based on the first position sensing signal and determine a target sensing signal based on at least one corrected second position sensing signal, thereby eliminating a negative effect of an environment in which a position sensing element is located on a finally obtained position sensing signal, and improving the accuracy of the position sensing signal obtained by the position sensing system.

Features described in the embodiments of the present disclosure may be substituted for or combined with each other. Each of the embodiments emphasizes the differences from others, and the same or similar parts among the embodiments can be referred to each other.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

What is claimed is:

1. A position sensing system, comprising: a signal processing module, a first position sensing element, and at least one second position sensing element, wherein the first position sensing element is configured to output a first position sensing signal in response to a predetermined signal;

the at least one second position sensing element is configured to output a second position sensing signal in response to the predetermined signal; and the signal processing module is configured to: provide the predetermined signal to the first position sensing element and the at least one second position sensing element, correct the second position sensing signal outputted by the at least one second position sensing element based on the first position sensing signal, and determine a target sensing signal based on at least one corrected second position sensing signal;

wherein the signal processing module comprises a digital control circuit, and the digital control circuit is configured to correct the second position sensing signal outputted by the at least one second position sensing element based on the first position sensing signal by:

substituting the first position sensing signal in a following first predetermined equation to calculate the corrected second position sensing signal:

$$V2 = VOUT * \frac{A2 \times B2}{A1 \times B1}.$$

where V2 represents the corrected second position sensing signal, VOUT represents the first position sensing signal having a predetermined constant amplitude, A2 represents an amplification factor of the signal processing module for the second position sensing signal outputted by the at least one second position sensing element, A1 represents an amplification factor of the signal processing module for the first position sensing signal outputted by the first position sensing element, B2 represents a magnetic field intensity at the at least one second position sensing element, and B1 represents a magnetic field intensity at the first position sensing element, wherein the digital control circuit is further configured to adjust the predetermined signal based on the first position sensing signal outputted by the first position sensing element to control the first position sensing element to output the first position sensing signal having a predetermined constant amplitude.

2. The position sensing system according to claim 1, wherein the signal processing module further comprises: a selection control circuit, a variable gain amplifier, a sampling and holding circuit, and a current source control circuit, wherein the selection control circuit comprises a plurality of channels, the plurality of channels correspond to the first position sensing element and the at least one second position sensing element with one-to-one correspondence, and the selection control circuit is configured to connect the first position sensing element and the at least one second position sensing element with the variable gain amplifier through the plurality of channels;

the variable gain amplifier is configured to amplify the first position sensing signal outputted by the first position sensing element and the second position sensing signal outputted by the at least one second position sensing element to obtain an amplified first position sensing signal and an amplified second position sensing signal;

the sampling and holding circuit is configured to convert the amplified first position sensing signal in an analog voltage signal form to an amplified first position sensing signal in a digital signal form, and transmit the amplified first position sensing signal in the digital signal form to the digital control circuit; and the digital control circuit is configured to: control the current source control circuit to provide the predetermined signal to the first position sensing element and the at least one second position sensing element, correct the at least one second position sensing signal in the digital signal form based on the first position sensing signal in the digital signal form, and determine the target sensing signal based on the at least one corrected second position sensing signal.

3. The position sensing system according to claim 2, wherein, when a number of the at least one second position sensing element is greater than 1 and a number of the at least one corrected second position sensing signal is greater than 1, the digital control circuit is configured to determine the target sensing signal based on the at least one corrected second position sensing signal by:

determining one of corrected second position sensing signals as the target sensing signal.

4. The position sensing system according to claim 2, wherein, when a number of the at least one second position sensing element is greater than 1 and a number of the at least one corrected second position sensing signal is greater than 1, the digital control circuit is configured to determine the target sensing signal based on the at least one corrected second position sensing signal by:

determining an average value of all corrected second position sensing signals as the target sensing signal.

5. The position sensing system according to claim 2, wherein the digital control circuit is further configured to control the current source control circuit to mirror the predetermined signal and transmit a mirrored predetermined signal to the first position sensing element and the at least one second position sensing element.

6. The position sensing system according to claim 2, wherein the selection control circuit and the sampling and holding circuit are configured to operate using a same clock.

7. The position sensing system according to claim 2, wherein the digital control circuit is further configured to determine target position information based on the target sensing signal.

8. The position sensing system according to claim 1, wherein the predetermined signal comprises a predetermined current signal or a predetermined voltage signal.

9. A method for acquiring a position sensing signal, wherein the method is applicable to a position sensing system comprising a first position sensing element and at least one second position sensing element, and the method for acquiring a position sensing signal comprises:

acquiring a first position sensing signal outputted by the first position sensing element in response to a predetermined signal;

acquiring a second position sensing signal outputted by the at least one second position sensing element in response to the predetermined signal; and correcting the second position sensing signal outputted by the at least one second position sensing element based on the first position sensing signal, and determining a target sensing signal based on at least one corrected second position sensing signal;

wherein the correcting the second position sensing signal outputted by the at least one second position sensing element based on the first position sensing signal comprises:

substituting the first position sensing signal in a following first predetermined equation to calculate the corrected second position sensing signal:

$$V2 = VOUT * \frac{A2 \times B2}{A1 \times B1}.$$

where V2 represents the corrected second position sensing signal, VOUT represents the first position sensing signal having a predetermined constant amplitude, A2 represents an amplification factor of a signal processing module for the second position sensing signal outputted by the at least one second position sensing element, A1 represents an amplification factor of the signal processing module for the first position sensing signal outputted by the first position sensing element, B2 represents a magnetic field intensity at the at least one second position sensing element, and B1 represents a magnetic field intensity at the first position sensing element, wherein the correcting the second position sensing signal outputted by the at least one second position sensing element based on the first position sensing signal further comprises:

adjusting the predetermined signal based on the first position sensing signal outputted by the first position sensing element to control the first position sensing element to output the first position sensing signal having a predetermined constant amplitude.

10. The method for acquiring a position sensing signal according to claim 9, wherein, when a number of the at least one second position sensing element is greater than 1 and a number of the at least one corrected second position sensing signal is greater than 1, the determining a target sensing signal based on the at least one corrected second position sensing signal comprises:

determining one of corrected second position sensing signals as the target sensing signal.

11. The method for acquiring a position sensing signal according to claim 9, wherein, when a number of the at least one second position sensing element is greater than 1 and a number of the at least one corrected second position sensing signal is greater than 1, the determining a target sensing signal based on the at least one corrected second position sensing signal comprises:

determining an average value of all corrected second position sensing signals as the target sensing signal.

12. An electronic device, comprising: a position sensing system and a magnet for providing a magnetic field, the position sensing system comprising: a signal processing module, a first position sensing element, and at least one second position sensing element, wherein the first position sensing element is configured to output a first position sensing signal in response to a predetermined signal;

the at least one second position sensing element is configured to output a second position sensing signal in response to the predetermined signal; and the signal processing module is configured to: provide the predetermined signal to the first position sensing element and the at least one second position sensing element, correct the second position sensing signal outputted by the at least one of the second position sensing element based on the first position sensing signal, and determine a target sensing signal based on at least one corrected second position sensing signal;

wherein the signal processing module comprises a digital control circuit, and the digital control circuit is configured to correct the second position sensing signal outputted by the at least one second position sensing element based on the first position sensing signal by:

substituting the first position sensing signal in a following first predetermined equation to calculate the corrected second position sensing signal:

$$V2 = VOUT * \frac{A2 \times B2}{A1 \times B1}.$$

where V2 represents the corrected second position sensing signal, VOUT represents the first position sensing signal having a predetermined constant amplitude, A2 represents an amplification factor of the signal processing module for the second position sensing signal outputted by the at least one second position sensing element, A1 represents an amplification factor of the signal processing module for the first position sensing signal outputted by the first position sensing element, B2 represents a magnetic field intensity of the magnetic field at the at least one second position sensing element, and B1 represents a magnetic field intensity of the magnetic field at the first position sensing element, wherein the digital control circuit is further configured to adjust the predetermined signal based on the first position sensing signal outputted by the first position sensing element to control the first position sensing element to output the first position sensing signal having a predetermined constant amplitude.

13. The electronic device according to claim 12, wherein the signal processing module further comprises: a selection control circuit, a variable gain amplifier, a sampling and holding circuit, and a current source control circuit, wherein the selection control circuit comprises a plurality of channels, the plurality of channels correspond to the first position sensing element and the at least one second position sensing element with one-to-one correspondence, and the selection control circuit is configured to connect the first position sensing element and the at least one second position sensing element with the variable gain amplifier through the plurality of channels;

the variable gain amplifier is configured to amplify the first position sensing signal outputted by the first position sensing element and the second position sensing signal outputted by the at least one second position sensing element to obtain an amplified first position sensing signal and an amplified second position sensing signal;

the sampling and holding circuit is configured to convert the amplified first position sensing signal in an analog voltage signal form to an amplified first position sensing signal in a digital signal form, and transmit the amplified first position sensing signal in the digital signal form to the digital control circuit; and the digital control circuit is configured to: control the current source control circuit to provide the predetermined signal to the first position sensing element and the at least one second position sensing element, correct the at least one second position sensing signal in the digital signal form based on the first position sensing signal in the digital signal form, and determine the target sensing signal based on the at least one corrected second position sensing signal.

14. The electronic device according to claim 13, wherein, when a number of the at least one second position sensing element is greater than 1 and a number of the at least one corrected second position sensing signal is greater than 1, the digital control circuit is configured to determine the target sensing signal based on the at least one corrected second position sensing signal by:

determining one of corrected second position sensing signals as the target sensing signal.

15. The electronic device according to claim 13, wherein, when a number of the at least one second position sensing element is greater than 1 and a number of the at least one corrected second position sensing signal is greater than 1, the digital control circuit is configured to determine the target sensing signal based on the at least one corrected second position sensing signal by:

determining an average value of all corrected second position sensing signals as the target sensing signal.

\* \* \* \* \*